July 21, 1942.    R. A. CHADWICK, JR    2,290,737
EXCAVATING AND LOADING ATTACHMENT FOR MOTOR DRIVEN DUMP TRUCKS
Filed Dec. 12, 1940
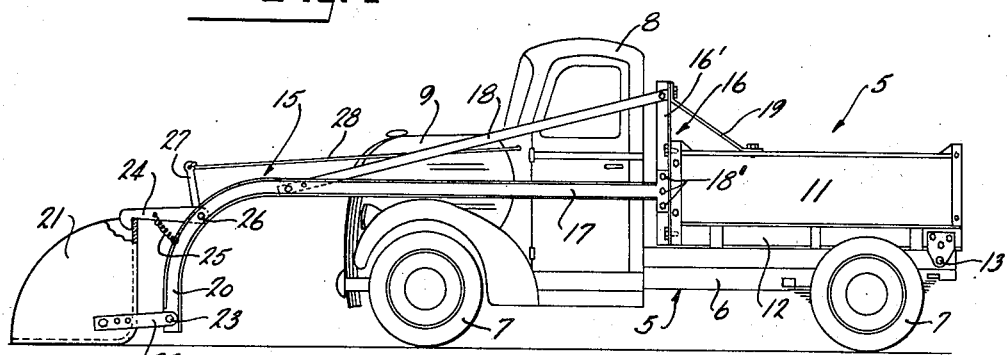
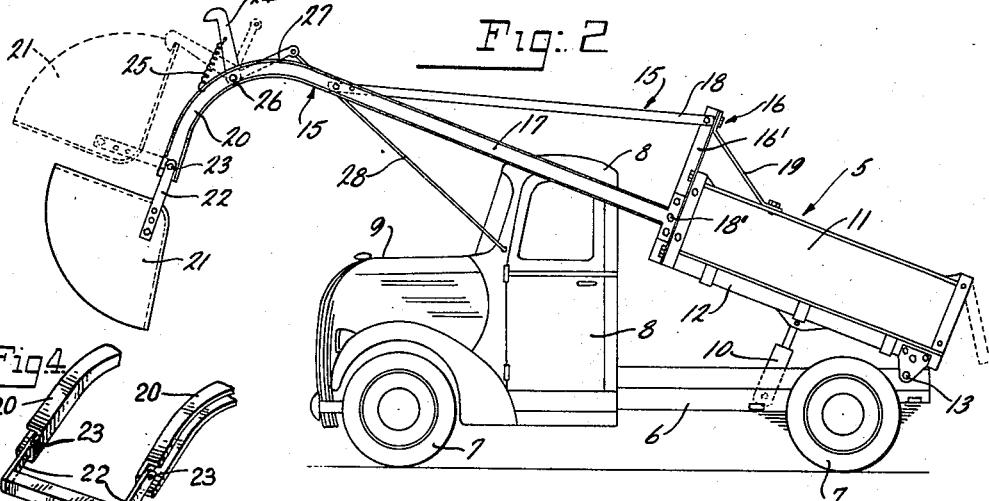
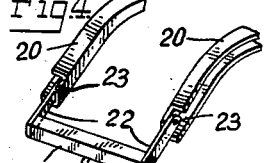
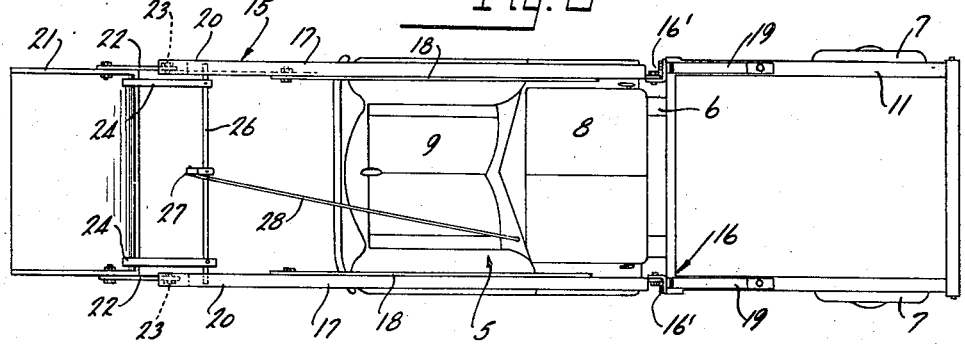
INVENTOR.
Robert A. Chadwick Jr.
BY John W. Michael
ATTORNEY.

Patented July 21, 1942

2,290,737

UNITED STATES PATENT OFFICE 2,290,737

EXCAVATING AND LOADING ATTACHMENT FOR MOTOR DRIVEN DUMP TRUCKS

Robert A. Chadwick, Jr., Milwaukee, Wis.

Application December 12, 1940, Serial No. 369,774

3 Claims. (Cl. 214—140)

This invention relates to an excavating and loading attachment for power-driven dump trucks.

One of the objects of the invention is to provide an attachment of this character which is simple and compact in construction, reliable and effective in operation, and easy and comparatively inexpensive to fabricate and install on any conventional dump truck.

The invention combines the loading and shoveling attachment with the body of the truck in such a special and advantageous manner that the instrumentalities, with which the dump truck is ordinarily provided, are practically available and effective for loading and unloading the scoop or shovel, and this under the control of the driver of the truck and from the cab thereof.

Other objects and advantages reside in certain novel features of the construction, arrangement, and combination of parts which will be hereinafter more fully described and particularly pointed out in the appended claims, reference being had to the accompanying drawing forming a part of this specification, and in which:

Figure 1 is a view in side elevation showing a dump truck equipped with an excavating and loading attachment embodying the present invention and showing the attachment in loading or excavating position;

Figure 2 is a view similar to Figure 1 but showing the scoop or shovel elevated and illustrating the manner in which it is dumped or unloaded;

Figure 3 is a view in top plan of the machine as shown in Figure 1; and

Figure 4 is a fragmentary perspective view illustrating the substitution of a lifting bar at the forward ends of the frame arms for the scoop or bucket to adapt the device for use as a crane.

Referring to the drawing, the numeral 5 designates generally a conventional dump truck which has the usual chassis 6 supported on the wheels 7. A cab 8 is provided for the driver of the trucks and the truck has the usual power plant enclosed in the hood 9 and functioning in the conventional fashion to propel the truck and also to supply the power for operating the hoist 10 which is utilized in the ordinary way to control the position of the tiltable body 11 of the truck. The body 11 of the truck is usually mounted on a frame 12 which is pivotally supported on the chassis, as indicated at 13. In dump trucks of this character the body 11 may be positioned as shown in Figure 1 for transporting material contained therein from one place to another, and when the material is to be dumped or discharged from the body 11 the hoist 10 is motivated to tilt the body 11 to the position shown in Figure 2.

The present invention proposes to combine with the tiltable body 11 of the truck or with its frame 12 an excavating and loading attachment, designated generally at 15. This attachment comprises in the main a frame 16 which may be rigidly secured in any suitable way to the frame 12 or body of the dump truck. Scoop-carrying arms 17, one at each side of the truck, are provided, and these are securely bolted or otherwise releasably fastened, as indicated at 18', to the vertical members 16' of the frame 16. Braces 18 and 19 are provided between the arm 17 and frame 16 and between the frame 16 and the body 11 of the truck. The braces 18 and 19, like the scoop-carrying arms 17, are detachably though rigidly secured in position in the assembly.

The forward ends of the scoop- or shovel-carrying arms 17 are preferably curved forwardly and downwardly, as indicated at 20. A scoop or shovel 21 is suitably mounted on the forward ends 20 of the shovel-carrying arms. Such mounting may be advantageously effected by providing brackets 22, which are rigidly attached to the scoop or shovel, and which are pivotally connected, as at 23, to the arms 17.

A pair of latch arms 24 are provided for holding the shovel or scoop in loading position, the latch arms being biased to latching position by means of a spring 25. The latch arms 24 are secured to a mounting shaft 26 rotatably supported in suitable bearings in the forward end portions 20 of the scoop-carrying arms 17. Intermediate its ends this shaft 26 is provided with a crank arm 27. A control line 28 extends from the crank arm 27 to the interior of the cab so that it may be conveniently manipulated by the driver of the truck.

With this construction when the attachment is positioned, as shown in Figure 1, the truck may be propelled forwardly under its own power to cause the shovel or scoop 21 to excavate or to load. When the contents are to be dumped into a car or an elevated hopper, or into any other place of deposit, the driver of the truck actuates the hoist 10 to tilt the body of the truck and the shovel-carrying arm 17 to the position shown in Figure 2. Then the truck is manipulated to spot the shovel or scoop 21 over the place into which its contents are to be discharged. When this has been accomplished the driver of the truck pulls on the control line 28 to rotate the shaft 26 and thus disengage the latch arms 24 from the scoop 21. The scoop then swings by gravity from the position shown in dotted lines in Figure 2 to the dumping or discharging position shown in full lines in Figure 2, and the contents thereof are discharged by gravity therefrom.

The hoist 10 may be employed to elevate the scoop-carrying arm 17 to a greater degree than that illustrated in Figure 2. In fact this is usually done when traveling from place to place, and also in order to raise the arms to a position above the doors of the cab so that the operator may get into and out of the cab conveniently.

The element 21 has been variously described as a scoop or shovel as it may conveniently take the form of any type of excavating or loading bucket. The arm 17, frame 16, and braces 15 and 19, while illustrating one practical construction, are, of course, intended only as illustrating one type of bucket crowding and hoisting frame. The structural details of the bucket crowding and hoisting frame may, of course, be varied, and it may be secured or fastened at its rearward end either to the body 11 or to the frame of the body 11, or to both the body 11 and its frame. The essential feature of the invention resides in the provision of a bucket crowding and hoisting frame having its rearward end fixedly interconnected with the tiltable body of the dump truck so as to be bodily movable therewith when the truck is moved and swingable therewith when the truck body is tilted relative to the truck, together with an excavating or loading bucket so mounted on the forward end of the bucket crowding and hoisting frame that it is shiftable from a loading or excavating to a dumping or discharging position, and when in loading position is subjected and responsive to the crowding action of the bucket crowding and hoisting frame whereas it is under the control of the hoisting action of the bucket crowding hoisting frame in either loading or dumping position. The organization is also so constituted that it may be conveniently controlled by the operator of the truck from the cab of the truck.

The present invention is also adapted for use as a crane, and in some instances this is accomplished simply by tying or suspending the load or article to be elevated to the scoop, or obviously the scoop may be replaced by a cross bar extending transversely between and attached to the arms 17 by bracket members similar to the bracket members 22 employed to combine this bucket with the arms 17. Thus, as shown in Figure 4, the bucket 21 may be replaced by a cross bar 30 designed and adapted to have a load or article suspended therefrom.

While I have shown and described one construction in which the invention may be advantageously embodied, it is to be understood that the construction shown has been selected merely for the purpose of illustration or example, and that various changes in the size, shape, and arrangement of the parts may be made without departing from the spirit of the invention or the scope of the subjoined claims.

I claim:

1. An excavating and loading attachment for a motor-driven dump truck of the type having a tiltable body and means actuated from the motor of the truck and controllable by the driver thereof for raising and lowering said body and comprising a frame secured to the tiltable body and having vertical frame members, braces between the vertical members of the frame and the body of the truck, bucket-carrying arms having their rearward ends detachably and rigidly secured to the vertical members of said frame, braces between intermediate portions of the bucket-carrying arms and the vertical members of the frame, the forward ends of said bucket-carrying arms projecting forwardly of the truck and being curved forwardly and downwardly, a bucket, brackets secured to the bucket and pivotally connected to the forward ends of the bucket-carrying arms, latching means for releasably securing the bucket in loading position, and means controllable by the driver of the truck from the cab thereof for releasing said latches.

2. An excavating and loading attachment for a motor-driven dump truck of the type having a tiltable body and means actuated from the motor of the truck and controllable by the driver thereof for raising and lowering said body and comprising a bucket crowding and hoisting frame having its rearward end fixedly interconnected with said tiltable body so as to be bodily movable therewith when the truck is moved and swingable therewith when the body is tilted relative to the truck, the forward end of the frame projecting forwardly of the truck in all of the positions of the frame, a bucket mounted on the forward end of the frame so as to be shiftable from a loading to a dumping position, and means controllable at will by the operator of the truck to effect dumping of said bucket.

3. An attachment of the character described for use with a motor-driven dump truck of the type having a tiltable body and means actuated from the motor of the truck and controllable by the driver thereof for raising and lowering said body and comprising a pair of elongated arms disposed one on each side of the truck and having their rearward ends fixedly and rigidly secured to said body so as to be bodily movable therewith when the truck is moved and swingable therewith when the body is tilted relative to the truck, the forward ends of the arms projecting forwardly of the truck in all positions of the arms, and means carried by the forward ends of said arms adapted to elevate a load when the body of the truck is tilted upwardly.

ROBERT A. CHADWICK, Jr.